US008999087B2

(12) United States Patent
Kadokura et al.

(10) Patent No.: US 8,999,087 B2
(45) Date of Patent: Apr. 7, 2015

(54) MANUFACTURING METHOD FOR OPTICAL ELEMENT

(71) Applicant: Shimadzu Corporation, Kyoto-shi, Kyoto-fu (JP)

(72) Inventors: Kazutomo Kadokura, Kyoto (JP); Katsuhiko Tokuda, Kyoto (JP); Mamoru Hisamitsu, Kyoto (JP); Kazuya Inoue, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 13/840,938

(22) Filed: Mar. 15, 2013

(65) Prior Publication Data

US 2014/0261955 A1    Sep. 18, 2014

(51) Int. Cl.
| | |
|---|---|
| B29C 65/52 | (2006.01) |
| B29C 65/54 | (2006.01) |
| B31B 1/62 | (2006.01) |
| B31B 1/64 | (2006.01) |
| B32B 37/12 | (2006.01) |
| B32B 38/00 | (2006.01) |
| B32B 43/00 | (2006.01) |
| G02B 5/00 | (2006.01) |

(52) U.S. Cl.
CPC . *G02B 5/00* (2013.01); *Y10T 156/10* (2015.01)

(58) Field of Classification Search
USPC ........ 156/60, 250, 256, 258, 265, 267, 307.1, 156/307.3, 307.5
See application file for complete search history.

(56) References Cited

FOREIGN PATENT DOCUMENTS

| | | | | |
|---|---|---|---|---|
| JP | 2002228886 A | * | 8/2002 | ............... G02B 6/42 |
| JP | 2007-225786 A | | 9/2007 | |
| JP | 2008102228 A | * | 5/2008 | ............... G02F 1/37 |
| JP | 2010-087066 A | | 4/2010 | |

OTHER PUBLICATIONS

English Abstract of JP 2008-102228 (Apr. 24, 2014).*
English Abstract of JP 2002-228886 (Apr. 24, 2014).*
Machine English Translation of JP 2008-102228 (Apr. 24, 2014).*
Machine English Translation of JP 2002-228886 (Apr. 24, 2014).*

* cited by examiner

*Primary Examiner* — Sing P Chan
(74) *Attorney, Agent, or Firm* — Sughrue Mion, PLLC

(57) ABSTRACT

The outer shape of a surface to be bonded of a first optical crystal member is formed as a shape in which the length in a direction parallel to an optical axis of the first optical crystal member differs from the length in a direction perpendicular to the optical axis of the first optical crystal member. The outer shape of a surface to be bonded of a second optical crystal member is formed as a shape coinciding with the outer shape of the surface to be bonded of the first optical crystal member or a shape obtained by enlarging or reducing the coinciding shape in an orientation in which an optical axis of the second optical crystal member and the optical axis of the first optical crystal member are adjusted to a prescribed angle.

5 Claims, 6 Drawing Sheets

LASER CRYSTAL MEMBER
1 0

MANUFACTURING METHOD FOR OPTICAL ELEMENT

The contents of Japanese patent application no. 2010-236969, filed Oct. 22, 2012, are incorporated herein by reference.

TECHNICAL FIELD

The present invention relates to a manufacturing method for an optical element. More specifically, the present invention relates to a manufacturing method for an optical element which facilitates the bonding of one optical crystal member to another optical crystal member by adjusting the optical axes of both of the optical crystal members to a prescribed angle.

BACKGROUND ART

There is a conventionally known optical element in which a laser crystal and an optical crystal member which sandwiches a wavelength conversion crystal with a dummy material are bonded so as to be formed integrally (see Patent Literature 1).

On the other hand, although not a manufacturing method for an optical element, there is a known manufacturing method for a semiconductor device in which the alignment of a semiconductor chip with a mounting board is performed using the surface tension of a droplet of liquid (see Patent Literature 2).

PRIOR ART LITERATURES (PATENT LITERATURE 1) Japanese Unexamined Patent Application Publication 2007-225786
(PATENT LITERATURE 2) Japanese Unexamined Patent Application Publication 2010-087066

SUMMARY OF THE INVENTION

In the production of the conventional optical element described above, the laser crystal and the wavelength conversion crystal are bonded to one another after the alignment of the laser crystal and the optical crystal member is performed visually by an operator so that the optical axis of the laser crystal and the optical axis of the wavelength conversion crystal form a prescribed angle.

However, there is the problem that this precise alignment operation is difficult and requires the proficiency of the operator.

Therefore, the object of the present invention is to provide a manufacturing method for an optical element which facilitates the bonding of one optical crystal member to another optical crystal member by adjusting the optical axes of both of the optical crystal members to a prescribed angle.

In the manufacturing method of the conventional semiconductor device described above, it is necessary to establish hydrophilic regions and water-repellent regions on the mounting board or semiconductor chip, and the method is difficult to use directly for the manufacture of an optical element.

In a first aspect, the present invention provides a manufacturing method for an optical element in which a surface to be bonded of a first optical crystal member having an optical axis and a surface to be bonded of a second optical crystal member having an optical axis are bonded and formed integrally by adjusting both of the optical axes to a prescribed angle; wherein the outer shape of the surface to be bonded of the first optical crystal member is formed as a shape in which the length in a direction parallel to the optical axis of the first optical crystal member differs from the length in a direction perpendicular to the optical axis of the first optical crystal member; the outer shape of the surface to be bonded of the second optical crystal member is formed as a shape coinciding with the outer shape of the surface to be bonded of the first optical crystal member or a shape obtained by enlarging or reducing the coinciding shape in an orientation in which the optical axis of the second optical crystal member and the optical axis of the first optical crystal member are adjusted to the prescribed angle; and the surface to be bonded of the first optical crystal member and the surface to be bonded of the second optical crystal member are overlapped with a droplet of liquid interposed therebetween and are bonded so as to be formed integrally after autonomous alignment by surface tension.

In the manufacturing method for an optical element according to the first aspect described above, the surface to be bonded of the first optical crystal member has an outer shape in which the length in a direction parallel to the optical axis of the first optical crystal member differs from the length in a direction perpendicular to the optical axis of the first optical crystal member, and the surface to be bonded of the second optical crystal member has an outer shape which coincides with or is similar to the outer shape of the surface to be bonded of the first optical crystal member, so the autonomous alignment of the surface to be bonded of the first optical crystal member and the surface to be bonded of the second optical crystal member is performed favorably by the surface tension of a droplet of liquid. The outer shape of the surface to be bonded of the first optical crystal member is an outer shape which is regulated with respect to the optical axis of the first optical crystal member, and the outer shape of the surface to be bonded of the second optical crystal member is also an outer shape which is regulated with respect to the optical axis of the second optical crystal member, so the optical axis of the first optical crystal member and the optical axis of the second optical crystal member are aligned with a prescribed angle after autonomous alignment is performed. Therefore, an effect of facilitating the bonding of both of the optical crystal members by adjusting the optical axis of one optical crystal member and the optical axis of the other optical crystal member to a prescribed angle is achieved.

Specific examples of the outer shapes described above include rectangles and ellipses.

In a second aspect, the present invention provides a manufacturing method for an optical element according to the first aspect, wherein the outer shape of the surface to be bonded of the first optical crystal member is a rectangle, and the ratio of the long side length and the short side length of the rectangle is 5:4 to 5:3.

In the manufacturing method for an optical element according to the second aspect described above, the outer shape of the surface to be bonded is a rectangle, which makes the shape easy to mold (easier to mold than an ellipse, for example). In addition, since the ratio of the long side length and the short side length of the rectangle is 5:4 to 5:3, the autonomous alignment and heat dissipation are favorable. That is, if the ratio is made smaller than 5:4, there is an increased risk of alignment with an orientation differing by 90°. On the other hand, if the ratio is made larger than 5:3, the heat dissipation is poor, resulting in diminished output laser beam efficiency.

In a third aspect, the present invention provides a manufacturing method for an optical element according to the first or second aspect described above, wherein the first optical crystal member is a laser crystal, and the second optical crystal member is a member which sandwiches a wavelength conversion crystal with a dummy material.

With the manufacturing method for an optical element according to the third aspect described above, it is possible to favorably manufacture an optical element in which a laser crystal and a member which sandwiches a wavelength conversion crystal with a dummy material are bonded and formed integrally.

The manufacturing method for an optical element according to the present invention facilitates the bonding of one optical crystal member to another optical crystal member by adjusting the optical axes of both of the optical crystal members to a prescribed angle.

DETAILED DESCRIPTION OF THE EXEMPLARY EMBODIMENTS

Figure 1:
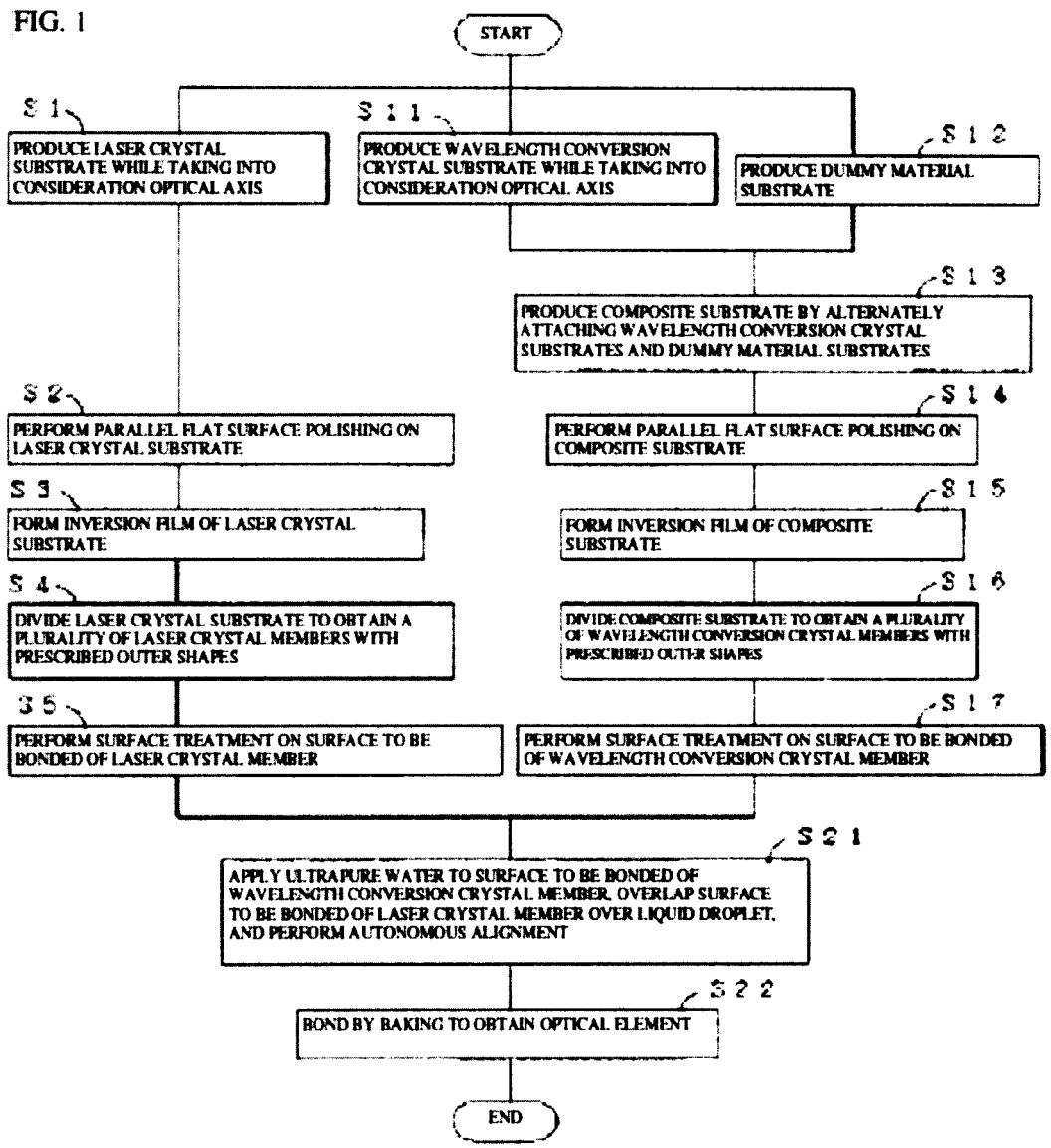
FIG. 1 is a flowchart showing the procedure of the manufacturing method for an optical element according to Embodiment 1.

The present invention will be described in further detail hereinafter using the embodiments shown in the drawings. The present invention is in no way limited by these embodiments.

Embodiment 1

FIG. 1 is a flowchart showing the procedure of the manufacturing method for an optical element.

In step S1, a laser crystal substrate is produced as a rectangular board having long sides in a direction parallel to the optical axis of a laser crystal and short sides in a direction perpendicular to the optical axis of the laser crystal. The laser crystal is a YVO4 crystal doped with Nd, for example.

In step S2, parallel flat surface polishing is performed on the two sides of the laser crystal substrate serving as the incident surface or the emission surface of a laser beam.

In step S3, an HR film for a fundamental wave is formed on the surface of the laser crystal substrate serving as the laser beam incident surface.

In step S4, the laser crystal substrate is divided to simultaneously obtain a plurality of rectangular laser crystal members having long sides in a direction parallel to the optical axis of the laser crystal and short sides in a direction perpendicular to the optical axis of the laser crystal.

In step S5, surface treatment is performed to improve the wetting of the surface serving as the laser beam emission surface of each laser crystal member. For example, dry etching is performed with an oxygen plasma.

Figure 2:
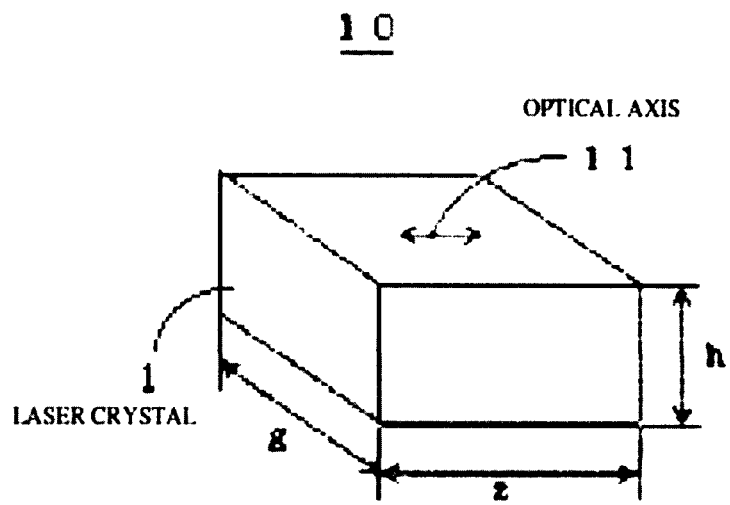
FIG. 2 is an oblique view showing a laser crystal member.

FIG. 2 shows a laser crystal member 10 obtained by steps S1 to S5.

This laser crystal member 10 is a rectangular board having long sides in a direction parallel to the optical axis 11 of a laser crystal 1 and short sides perpendicular to the optical axis 11 of the laser crystal 1. The long side length z is 1 mm, for example, and the short side length g is 0.8 mm, for example, while the thickness h is 0.5 mm, for example.

In step S11, a wavelength conversion crystal substrate is produced as a rectangular board having long sides in a direction parallel to the optical axis of a wavelength conversion crystal and short sides perpendicular to the optical axis of the wavelength conversion crystal. The wavelength conversion crystal is a ferroelectric crystal produced as a quasi-phase-matching crystal by forming a periodic polarization inversion structure, for example (LN, LT, or LN or LT doped with MgO).

In step S12, a dummy material substrate is produced as a board with the same rectangular shape as that of the wavelength conversion crystal substrate. In order to suppress adverse effects at the time of thermal expansion, the dummy material is preferably a material with approximately the same coefficient of thermal expansion as that of the laser crystal 1 or the wavelength conversion crystal. For example, a CLT substrate may be used.

Figure 3:
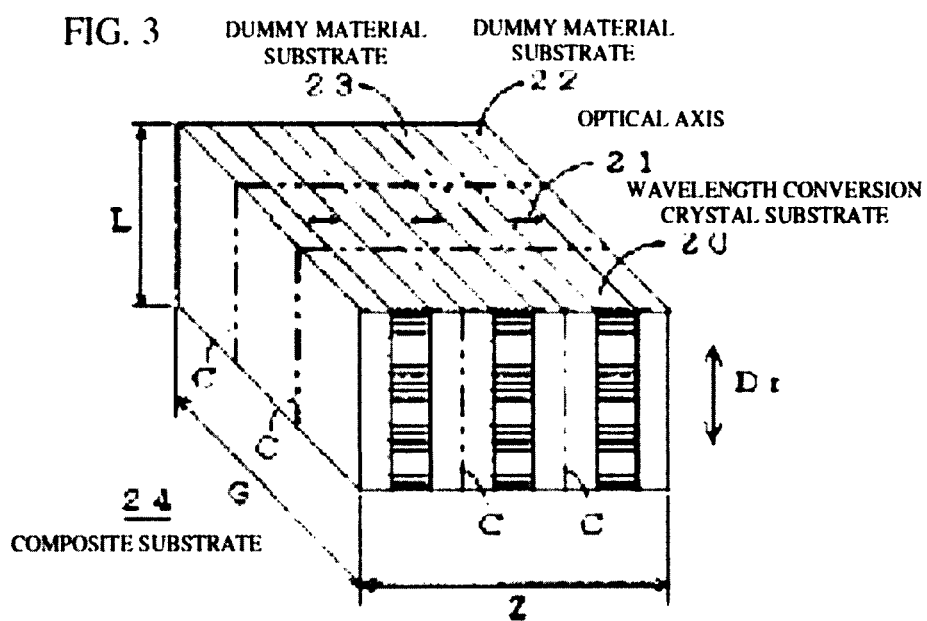
FIG. 3 is an oblique view showing a composite substrate.

In step S13, a composite substrate 24 is produced by alternately attaching a plurality of wavelength conversion crystal substrates 20 and a plurality of dummy material substrates 22 and 23, as shown in FIG. 3. The method of attachment may use an adhesive or may use an optical contact. The long side length Z of the composite substrate 24 is 3 mm, for example, and the short side length G is 2.4 mm, for example, while the thickness L is 1 mm, for example. The thickness direction is the polarization inversion direction Dr.

In step S14, parallel flat surface polishing is performed on the two sides of the composite substrate 24 serving as the incident surface or the emission surface of a laser beam.

In step S15, an HR film for a fundamental wave is formed on the surface of the composite substrate 24 serving as the laser beam emission surface.

In step S16, the composite substrate 24 is divided by the cutting-plane lines C shown in FIG. 3 to simultaneously obtain a plurality of rectangular wavelength conversion crystal members having long sides in a direction parallel to the optical axis of the wavelength conversion crystal and short sides in a direction perpendicular to the optical axis of the wavelength conversion crystal.

In step S17, surface treatment is performed to improve the wetting of the surface serving as the laser beam incident surface of each wavelength conversion crystal member. For example, dry etching is performed with an oxygen plasma.

Figure 4:
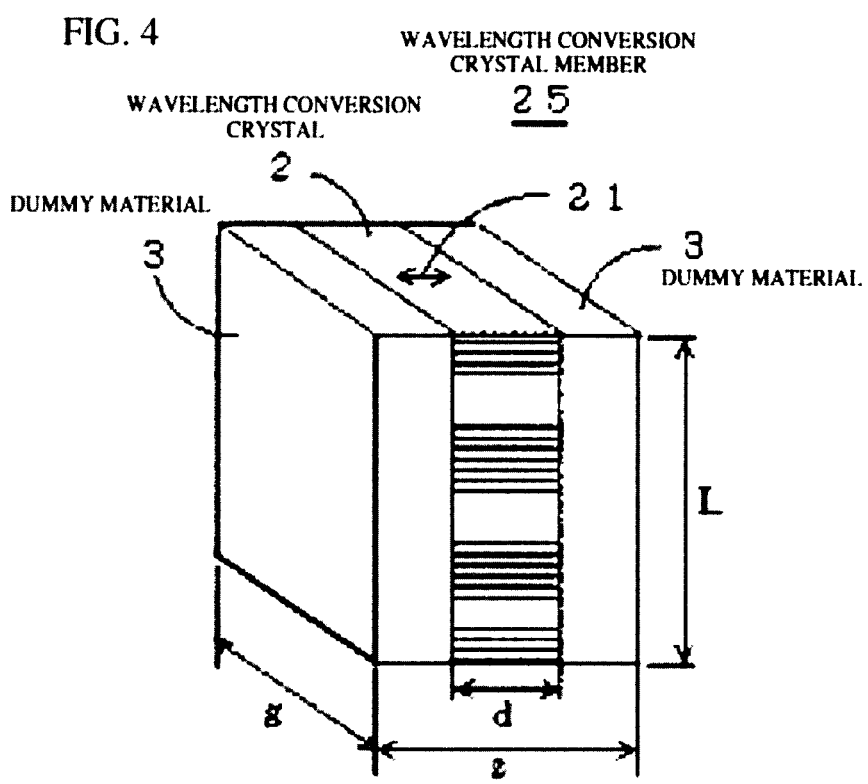
FIG. 4 is an oblique view showing a wavelength conversion crystal member.

FIG. 4 shows a wavelength conversion crystal member 25 obtained by steps S11 to S17.

This wavelength conversion crystal member 25 has long sides in a direction parallel to the optical axis 21 of a wavelength conversion crystal 2 and short sides in a direction perpendicular to the optical axis 21 of the wavelength conversion crystal 2. The long side length z is 1 mm, for example, and the short side length g is 0.8 mm, for example, while the thickness L is 1 mm, for example. The length d of the wavelength conversion crystal 2 in a direction parallel to the optical axis 21 of the wavelength conversion crystal 2 is 0.4 mm, for example. The length of a dummy material 3 in a direction parallel to the optical axis 21 of the wavelength conversion crystal 2 is 0.2 mm, for example.

Figure 5:
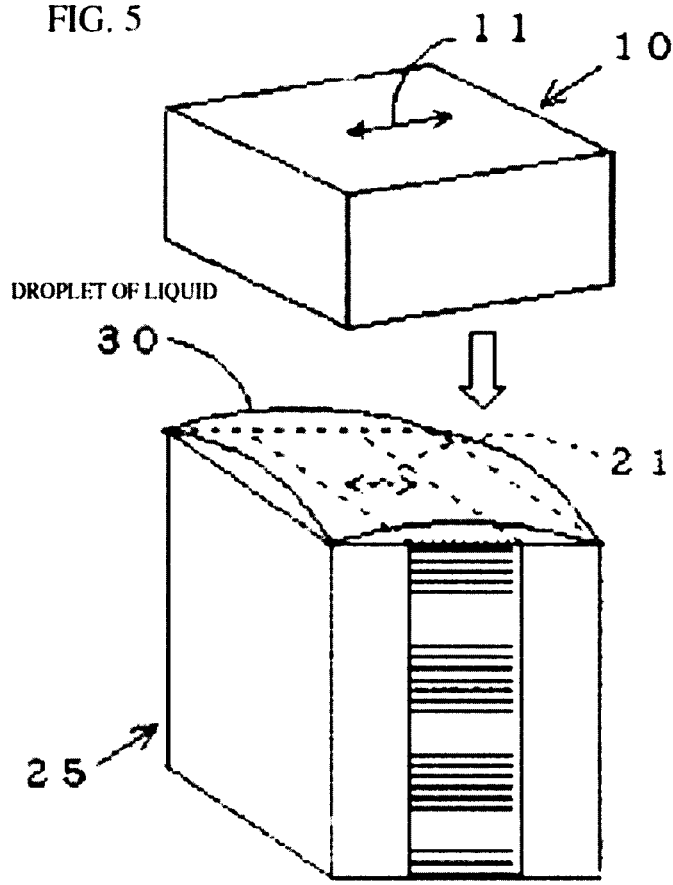
FIG. 5 is an oblique view showing the bonding process of the laser crystal member and the wavelength conversion crystal member.
Figure 6:
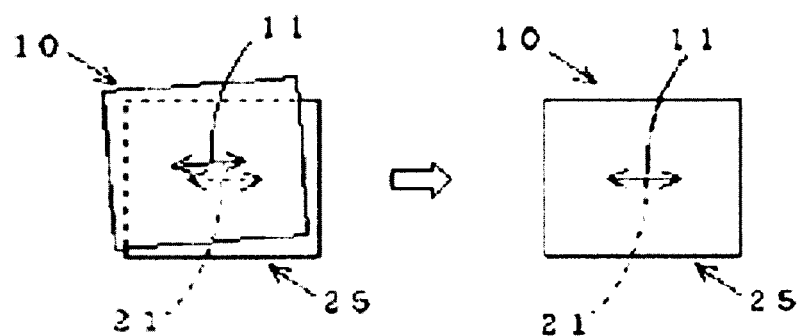
FIG. 6 is an explanatory diagram of autonomous alignment.

In step S21, as shown in FIG. 5, ultrapure water is applied to the surface (surface to be bonded) of the wavelength conversion crystal member 25 serving as the laser beam incident surface, and after the surface (surface to be bonded) of the laser crystal member 10 serving as the laser beam emission surface is overlapped over this droplet of liquid 30, autonomous alignment is performed as shown in FIG. 6.

Figure 7:
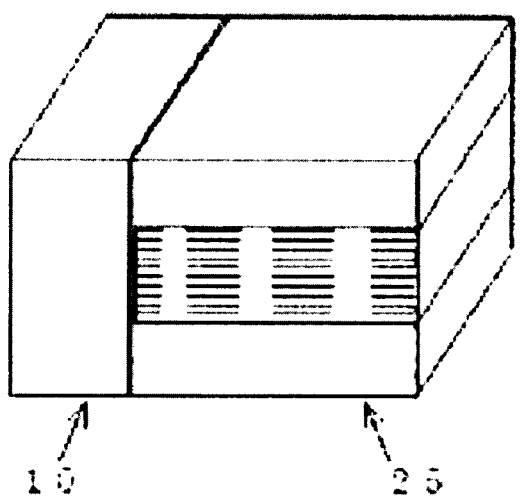
FIG. 7 is an oblique view showing a manufactured optical element.

In step S22, the laser crystal member 10 and the wavelength conversion crystal member 25 are bonded by baking and formed integrally to obtain an optical element 50 as shown in FIG. 7. The surfaces to be bonded of the laser crystal member 10 and the wavelength conversion crystal member 25 are kept precise and solid by an optical contact.

Figure 8:
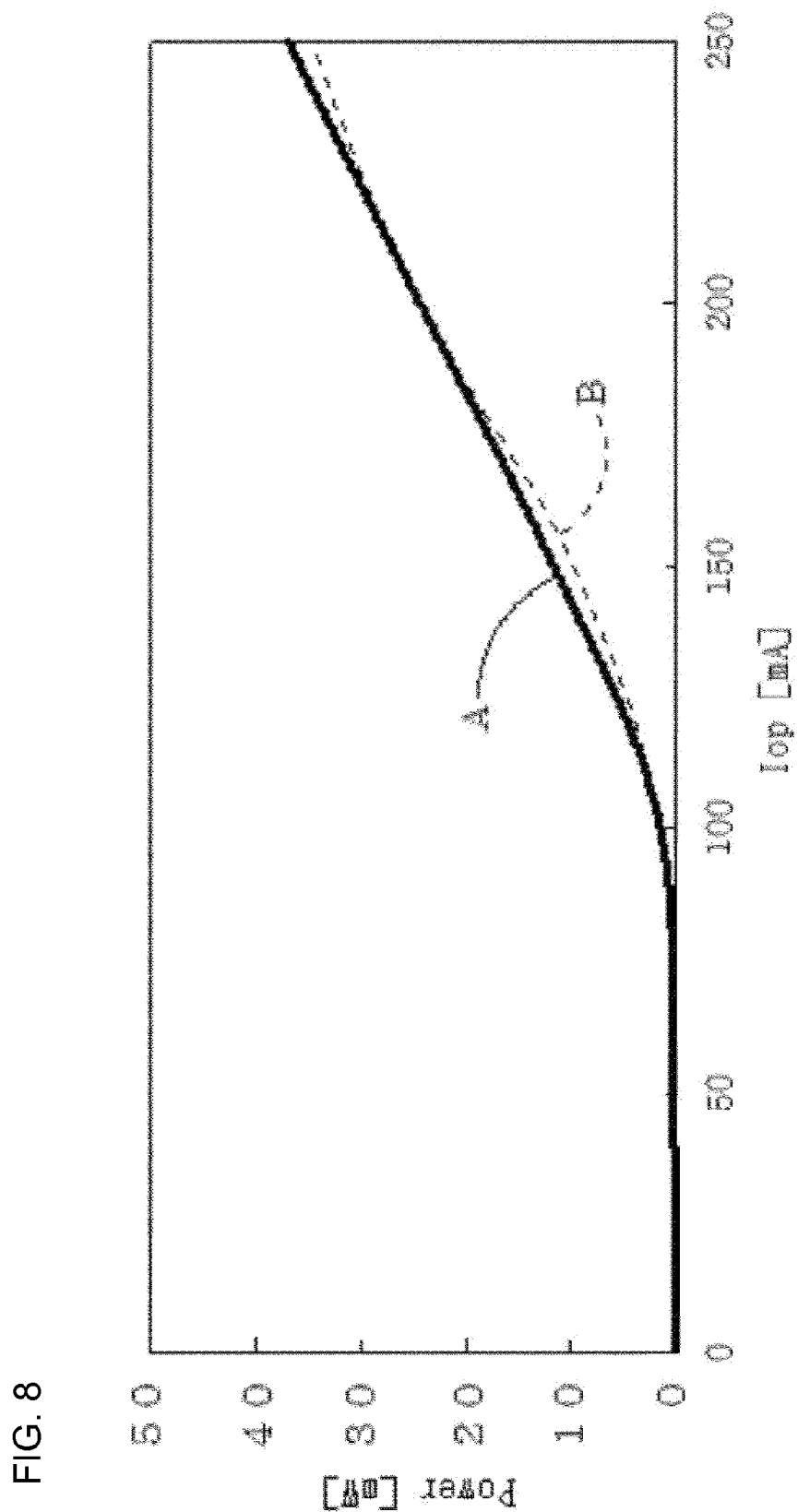
FIG. 8 is a graph comparing the properties of an optical element manufactured by the method of the present invention and the properties of an optical element manufactured by a conventional method.

The solid line A shown in FIG. 8 indicates the properties of the optical element 50 manufactured with the method of the present invention. On the other hand, the dashed line B shows the properties of an optical element manufactured by means of visual alignment by a proficient operator.

The optical element 50 manufactured with the method of the present invention has properties comparable to those of the optical element manufactured by means of visual alignment by a proficient operator.

With the manufacturing method for an optical element according to Embodiment 1, it is possible to align the directions of the optical axis 11 of the laser crystal 1 and the optical axis 21 of the wavelength conversion crystal 2 without requiring a proficient operator, which makes it possible to dramatically improve the productivity and yield of the optical element 50.

Embodiment 2

The length of the sides in the direction parallel to the optical axis 11 of the laser crystal member 10 may be set to 1 mm, for example, and the length of the sides in the direction perpendicular to the optical axis 11 may be set to 0.6 mm, for example.

Embodiment 3

In Embodiments 1 and 2, the outer shape of the surface to be bonded of the laser crystal member 10 and the outer shape of the surface to be bonded of the wavelength conversion crystal member 25 were the same, but the dimensions of one of the outer shapes may be enlarged or reduced up to approximately 20%. In this case as well, autonomous alignment is performed with practically effective precision.

Embodiment 4

In Embodiments 1 to 3, the outer shapes of the surfaces to be bonded of the laser crystal member 10 and the wavelength conversion crystal member 25 were rectangular, but they may also be formed as ellipses with ellipticity of 1.2 to 1.5.

The manufacturing method for an optical element according to the present invention can be used in the manufacture of an optical element in which one optical crystal member and another optical crystal member are bonded and formed integrally by adjusting the optical axes of both of the optical crystal members to a prescribed angle.

EXPLANATION OF REFERENCES

1 laser crystal
2 wavelength conversion crystal
3 dummy material
10 laser crystal member
11 optical axis
20 wavelength conversion crystal substrate
21 optical axis
24 composite substrate
25 wavelength conversion crystal member
30 droplet of liquid
50 optical element

What is claimed is:

1. A manufacturing method for an optical element in which a surface to be bonded of a first optical crystal member having an optical axis and a surface to be bonded of a second optical crystal member having an optical axis are bonded and formed integrally by adjusting both of the optical axes to a prescribed angle;
    wherein an outer shape of the surface to be bonded of said first optical crystal member is formed as a shape in which the length in a direction parallel to the optical axis of said first optical crystal member differs from the length in a direction perpendicular to the optical axis of said first optical crystal member;
    an outer shape of the surface to be bonded of said second optical crystal member is formed as a shape coinciding with the outer shape of the surface to be bonded of said first optical crystal member or a shape obtained by enlarging or reducing the coinciding shape in an orientation in which the optical axis of said second optical crystal member and the optical axis of said first optical crystal member are adjusted to said prescribed angle;
    the surface to be bonded of said first optical crystal member and the surface to be bonded of said second optical crystal member are overlapped with a droplet of liquid interposed therebetween and are bonded so as to be formed integrally after autonomous alignment by surface tension,
    the outer shape of the surface to be bonded of said first optical crystal member is a rectangle,
    the first optical crystal member and the second optical crystal member are rectangular parallelepipeds, and
    said autonomous alignment by surface tension causes corresponding sides of the surface to be bonded of said first optical crystal member and the surface to be bonded of said second optical crystal member to be parallel.

2. A manufacturing method for an optical element according to claim 1, wherein the ratio of the long side length and the short side length of said rectangle is 5:4 to 5:3.

3. A manufacturing method for an optical element according to claim 2, wherein said first optical crystal member is a laser crystal, and said second optical crystal member is a member which sandwiches a wavelength conversion crystal with a dummy material.

4. A manufacturing method for an optical element according to claim 1, wherein said first optical crystal member is a laser crystal, and said second optical crystal member is a member which sandwiches a wavelength conversion crystal with a dummy material.

5. A manufacturing method for an optical element according to claim 1, wherein said droplet of liquid consists essentially of water.

* * * * *